Sept. 11, 1923.
L. SABARROS
APPARATUS FOR THE MECHANICAL HANDLING OF GOODS
Filed June 12, 1922
1,467,504
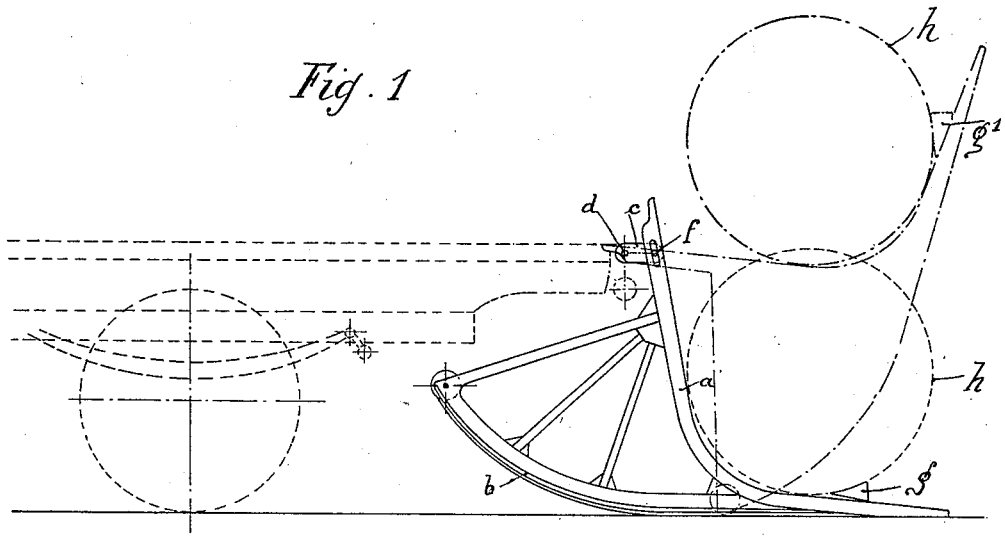
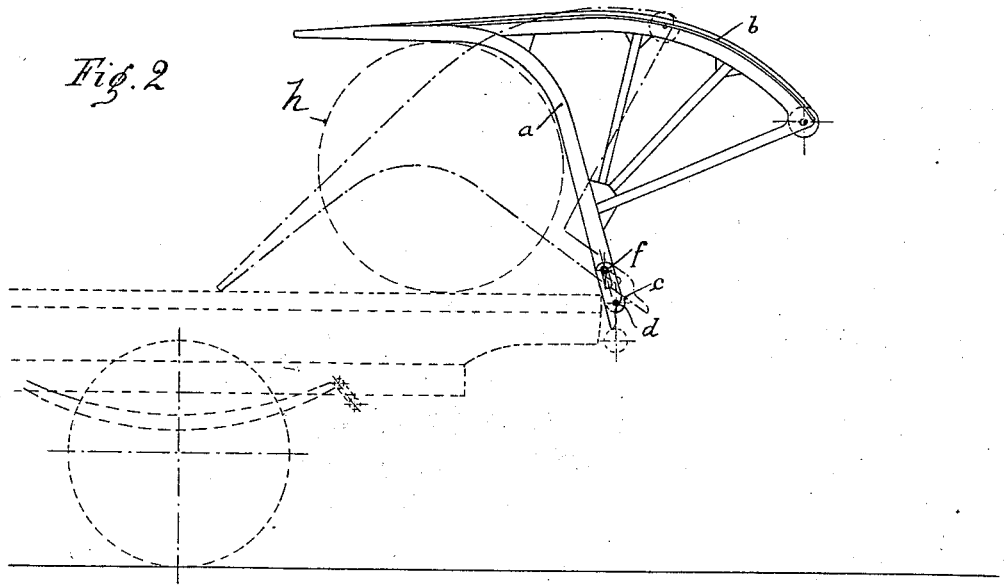

Patented Sept. 11, 1923.

1,467,504

UNITED STATES PATENT OFFICE.

LOUIS SABARROS, OF BAYONNE, FRANCE.

APPARATUS FOR THE MECHANICAL HANDLING OF GOODS.

Application filed June 12, 1922. Serial No. 567,774.

*To all whom it may concern:*

Be it known that I, LOUIS SABARROS, a citizen of the Republic of France, and a resident of Bayonne, Basses-Pyrenees, France, have invented certain new and useful Improvements in Apparatus for the Mechanical Handling of Goods; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an apparatus for the rapid loading and unloading of casks upon motor trucks or other vehicles, by employing for such operations the sole effort of traction produced by the forward or backward motion of the vehicle under consideration.

The accompanying drawings show by way of example an embodiment of the said invention, wherein:

Fig. 1 represents the rear portion of a motor truck provided with the said apparatus in the loading position.

Fig. 2 represents the same as folded upon the vehicle after the loading of the cask.

The apparatus comprises two like elements of curved shape which are connected together by cross-pieces, each element comprising a curved member $a$ whereupon is disposed the cask $h$ to be raised, a ground piece $b$ having the shape of a circular arc, two links $c$ which are pivoted at one end to the axle $d$ forming part of the vehicle and at the other end to the axle $f$ which is movable in the elongated apertures formed in the member $a$.

The operation of the apparatus, for loading purposes, is as follows:

The cask $h$ is brought upon the member $a$ and is maintained thereon by the wedges $g$, whereupon the vehicle is moved forward, and through the medium of the axle $d$, links $c$ and axle $f$, the vehicle will exert a traction upon the upper part of the member $a$. The ground piece $b$ is provided with means to prevent slipping upon the soil, and the adhesion to the ground will be greater as the cask is heavier. In these conditions the traction of the links $c$ is transformed into a rolling movement of the ground piece $b$ upon the ground. During this movement, the member $a$ will gradually rise, lifting with it the cask. At the end of the movement, as represented in the dotted lines, Fig. 1, the cask $h$ is now at the level of the flooring of the vehicle and is enabled to roll upon the branch of the member $a$ which is substantially horizontal. On completion of the loading, the device is folded upon the vehicle as shown in Fig. 2, and is transported in this position to the place of unloading.

To carry out the unloading, the operation takes place in the contrary sense. The device is brought down upon the ground, and the member $a$ has substantially the horizontal position in the portion thereof which is provided with the said elongated aperture.

The cask to be unloaded is brought upon said member, and a suitable wedge is disposed at $g^1$, Fig. 1; the vehicle is driven backwards whereby the member $b$ is caused to roll upon the ground, thus producing the gradual lowering of the cask $h$. At the end of this movement, the member $a$ rests upon the ground by means of its shoe, and by the removal of the wedge or wedges retaining the cask, the latter can be rolled out with facility. When the unloading operations are completed, the said device is again folded upon the vehicle and is maintained thereupon by any suitable means.

It is obvious that the said apparatus is applicable not only to the handling of casks but also of all suitable goods.

What I claim is:—

1. A vehicle comprising at the rear, curved extension elements so disposed that their ends may be brought adjacent the ground in tangential position, whereby goods and casks may be engaged and rolled upon the said extension elements, a ground piece having the shape of a circular arc secured to said extension elements, traction means provided upon the periphery of the said ground pieces, and pivoted portions disposed between and loosely connecting the rear end of the vehicle and the said curved extension elements, whereby the motion of the vehicle shall cause the said ground piece to roll upon the ground without sliding and shall raise the goods carried by the said curved elements.

2. A vehicle comprising at the rear, curved extension elements, so disposed that their ends may be brought adjacent the ground in tangential position, whereby goods and casks may be engaged and rolled upon the said curved extension elements, a ground piece having the shape of a circular arc secured to the said extension elements, traction means provided upon the periphery of the said ground pieces, links pivoted to the rear of the vehicle, studs mounted upon said links, slots formed in the upper ends of the said extension elements and co-operating with the said studs, whereby the motion of the vehicle shall cause the said ground piece to roll upon the ground without sliding and shall raise the goods carried by the said curved elements.

In testimony that I claim the foregoing as my invention, I have signed my name hereto.

LOUIS SABARROS.